US012079325B2

(12) United States Patent
Myers (10) Patent No.: US 12,079,325 B2
(45) Date of Patent: Sep. 3, 2024

(54) PASSWORD RESETTING SYSTEM AND METHOD

(71) Applicant: EMC IP Holding Company, LLC, Hopkinton, MA (US)

(72) Inventor: Jackson Brandon Myers, Cary, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 147 days.

(21) Appl. No.: 17/239,145

(22) Filed: Apr. 23, 2021

(65) Prior Publication Data

US 2022/0342980 A1 Oct. 27, 2022

(51) Int. Cl.
*G06F 21/46* (2013.01)

(52) U.S. Cl.
CPC .................................. *G06F 21/46* (2013.01)

(58) Field of Classification Search
CPC ....................................................... G06F 21/46
See application file for complete search history.

(56) References Cited

U.S. PATENT DOCUMENTS

| | | | | |
|---|---|---|---|---|
| 6,735,720 B1* | 5/2004 | Dunn | ................... | G06F 11/0745 714/E11.023 |
| 6,871,286 B1* | 3/2005 | Cagle | .................... | H04L 63/083 709/225 |
| 8,321,682 B1* | 11/2012 | Read | ................... | H04L 63/0838 380/44 |
| 8,954,800 B1* | 2/2015 | Spangler | .................. | G06F 8/62 714/24 |
| 9,280,433 B2* | 3/2016 | Saretto | ................ | G06F 11/2284 |
| 10,601,816 B1* | 3/2020 | Stickle | .................... | H04W 4/08 |
| 10,817,346 B1* | 10/2020 | Culp | ................... | G06F 21/6218 |
| 11,144,676 B1* | 10/2021 | Palmer | ................ | G06F 21/6218 |
| 11,327,846 B2* | 5/2022 | Kumar | ................ | G06F 11/1461 |
| 11,360,844 B1* | 6/2022 | Dodsley | ............. | G06F 11/1438 |
| 2013/0282589 A1* | 10/2013 | Shoup | ..................... | G06F 21/34 726/5 |
| 2016/0036623 A1* | 2/2016 | Clarkson | ............. | G06F 11/2069 714/4.11 |
| 2016/0350009 A1* | 12/2016 | Cerreta | ................. | G06F 3/0656 |
| 2020/0104500 A1* | 4/2020 | Martino | .................... | G06F 8/65 |
| 2020/0143034 A1 | 5/2020 | Myers et al. | | |
| 2021/0034398 A1* | 2/2021 | Khandkar | ........... | G06F 11/1464 |
| 2022/0012137 A1* | 1/2022 | Xiao | .................... | G06F 9/44505 |
| 2022/0114252 A1* | 4/2022 | Syed | ..................... | G06F 21/554 |
| 2022/0166831 A1* | 5/2022 | Guendert | .............. | H04L 49/357 |
| 2022/0255966 A1* | 8/2022 | Sienicki | ............. | H04L 63/0435 |

* cited by examiner

*Primary Examiner* — James R Turchen
(74) *Attorney, Agent, or Firm* — Brian J. Colandreo; Heath M. Sargeant; Holland & Knight LLP (57) ABSTRACT

A method, computer program product, and computing system for detecting the initiation of a recovery procedure in a multi-node IT computing device; determining if a platform container on one of the nodes of the multi-node IT device is capable of executing the recovery procedure; if the platform container on one of the nodes of the multi-node IT device is capable of running the recovery procedure, executing the recovery procedure on the platform container; and if the platform container on none of the nodes of the multi-node IT device is capable of running the recovery procedure, executing the recovery procedure on a maintenance container on one of the nodes of the multi-node IT device.

21 Claims, 5 Drawing Sheets

PASSWORD RESETTING SYSTEM AND METHOD

TECHNICAL FIELD

This disclosure relates to storage management systems and, more particularly, to systems and methods for resetting passwords within storage management systems.

BACKGROUND

Storing and safeguarding electronic content is of paramount importance in modern business. Accordingly, various methodologies may be employed to protect and distribute such electronic content within storage management systems. In order to provide the requisite level of security with respect to such electronic content, password-protected user accounts may be utilized to gain access to such storage management systems (and the electronic content contained therein). Unfortunately, staff changes often occur and passwords are often forgotten/lost, resulting in lack of access and the complications related thereto.

SUMMARY OF DISCLOSURE

In one implementation, a computer-implemented method is executed on a computing device and includes: detecting the initiation of a recovery procedure in a multi-node IT computing device; determining if a platform container on one of the nodes of the multi-node IT device is capable of executing the recovery procedure; if the platform container on one of the nodes of the multi-node IT device is capable of running the recovery procedure, executing the recovery procedure on the platform container; and if the platform container on none of the nodes of the multi-node IT device is capable of running the recovery procedure, executing the recovery procedure on a maintenance container on one of the nodes of the multi-node IT device.

One or more of the following features may be included. The initiation of the recovery procedure in the multi-node IT computing device may occur on a first node of the multi-node IT device. Determining if a platform container on one of the nodes of the multi-node IT device is capable of executing the recovery procedure may include: determining if a platform container on a second node of the multi-node IT device is capable of executing the recovery procedure; and if the platform container on the second node of the multi-node IT device is not capable of running the recovery procedure, determining if a platform container on the first node of the multi-node IT device is capable of executing the recovery procedure. Determining if a platform container on one of the nodes of the multi-node IT device is capable of executing the recovery procedure may include: determining if a platform container on one of the nodes of the multi-node IT device is functioning properly, thus defining a properly functioning platform container. Determining if a platform container on one of the nodes of the multi-node IT device is capable of executing the recovery procedure may include: determining if a node associated with the properly functioning platform container is a primary node of the multi-node IT device. Executing the recovery procedure on the platform container may include: updating local security information via the platform container executing the recovery procedure, thus defining updated security information; and synchronizing the updated security information with a second node of the multi-node IT device via the platform container executing the recovery procedure. Executing the recovery procedure on a maintenance container on one of the nodes of the multi-node IT device may include: updating local security information via the maintenance container executing the recovery procedure, thus defining updated security information; notifying the platform container associated with the maintenance container executing the recovery procedure of the updated security information; and synchronizing the updated security information with a second node of the multi-node IT device via the platform container associated with the maintenance container executing the recovery procedure.

In another implementation, a computer program product resides on a computer readable medium and has a plurality of instructions stored on it. When executed by a processor, the instructions cause the processor to perform operations including: detecting the initiation of a recovery procedure in a multi-node IT computing device; determining if a platform container on one of the nodes of the multi-node IT device is capable of executing the recovery procedure; if the platform container on one of the nodes of the multi-node IT device is capable of running the recovery procedure, executing the recovery procedure on the platform container; and if the platform container on none of the nodes of the multi-node IT device is capable of running the recovery procedure, executing the recovery procedure on a maintenance container on one of the nodes of the multi-node IT device.

One or more of the following features may be included. The initiation of the recovery procedure in the multi-node IT computing device may occur on a first node of the multi-node IT device. Determining if a platform container on one of the nodes of the multi-node IT device is capable of executing the recovery procedure may include: determining if a platform container on a second node of the multi-node IT device is capable of executing the recovery procedure; and if the platform container on the second node of the multi-node IT device is not capable of running the recovery procedure, determining if a platform container on the first node of the multi-node IT device is capable of executing the recovery procedure. Determining if a platform container on one of the nodes of the multi-node IT device is capable of executing the recovery procedure may include: determining if a platform container on one of the nodes of the multi-node IT device is functioning properly, thus defining a properly functioning platform container. Determining if a platform container on one of the nodes of the multi-node IT device is capable of executing the recovery procedure may include: determining if a node associated with the properly functioning platform container is a primary node of the multi-node IT device. Executing the recovery procedure on the platform container may include: updating local security information via the platform container executing the recovery procedure, thus defining updated security information; and synchronizing the updated security information with a second node of the multi-node IT device via the platform container executing the recovery procedure. Executing the recovery procedure on a maintenance container on one of the nodes of the multi-node IT device may include: updating local security information via the maintenance container executing the recovery procedure, thus defining updated security information; notifying the platform container associated with the maintenance container executing the recovery procedure of the updated security information; and synchronizing the updated security information with a second node of the multi-node IT device via the platform container associated with the maintenance container executing the recovery procedure.

In another implementation, a computing system includes a processor and memory is configured to perform operations including: detecting the initiation of a recovery procedure in a multi-node IT computing device; determining if a platform container on one of the nodes of the multi-node IT device is capable of executing the recovery procedure; if the platform container on one of the nodes of the multi-node IT device is capable of running the recovery procedure, executing the recovery procedure on the platform container; and if the platform container on none of the nodes of the multi-node IT device is capable of running the recovery procedure, executing the recovery procedure on a maintenance container on one of the nodes of the multi-node IT device.

One or more of the following features may be included. The initiation of the recovery procedure in the multi-node IT computing device may occur on a first node of the multi-node IT device. Determining if a platform container on one of the nodes of the multi-node IT device is capable of executing the recovery procedure may include: determining if a platform container on a second node of the multi-node IT device is capable of executing the recovery procedure; and if the platform container on the second node of the multi-node IT device is not capable of running the recovery procedure, determining if a platform container on the first node of the multi-node IT device is capable of executing the recovery procedure. Determining if a platform container on one of the nodes of the multi-node IT device is capable of executing the recovery procedure may include: determining if a platform container on one of the nodes of the multi-node IT device is functioning properly, thus defining a properly functioning platform container. Determining if a platform container on one of the nodes of the multi-node IT device is capable of executing the recovery procedure may include: determining if a node associated with the properly functioning platform container is a primary node of the multi-node IT device. Executing the recovery procedure on the platform container may include: updating local security information via the platform container executing the recovery procedure, thus defining updated security information; and synchronizing the updated security information with a second node of the multi-node IT device via the platform container executing the recovery procedure. Executing the recovery procedure on a maintenance container on one of the nodes of the multi-node IT device may include: updating local security information via the maintenance container executing the recovery procedure, thus defining updated security information; notifying the platform container associated with the maintenance container executing the recovery procedure of the updated security information; and synchronizing the updated security information with a second node of the multi-node IT device via the platform container associated with the maintenance container executing the recovery procedure.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
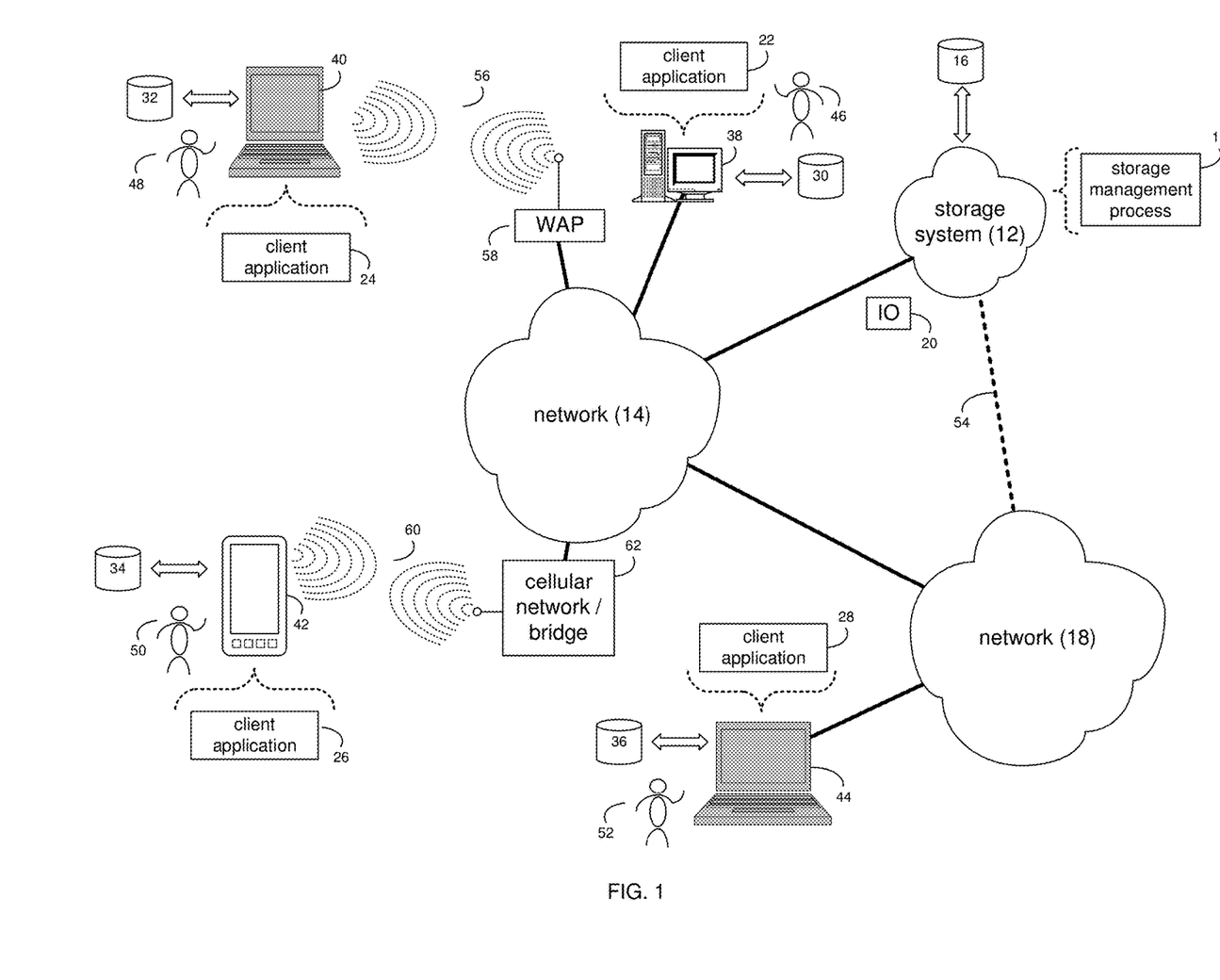
FIG. 1 is a diagrammatic view of a storage system and a storage management process coupled to a distributed computing network.

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a storage appliance, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™, Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

The Data Storage System

Figure 2:
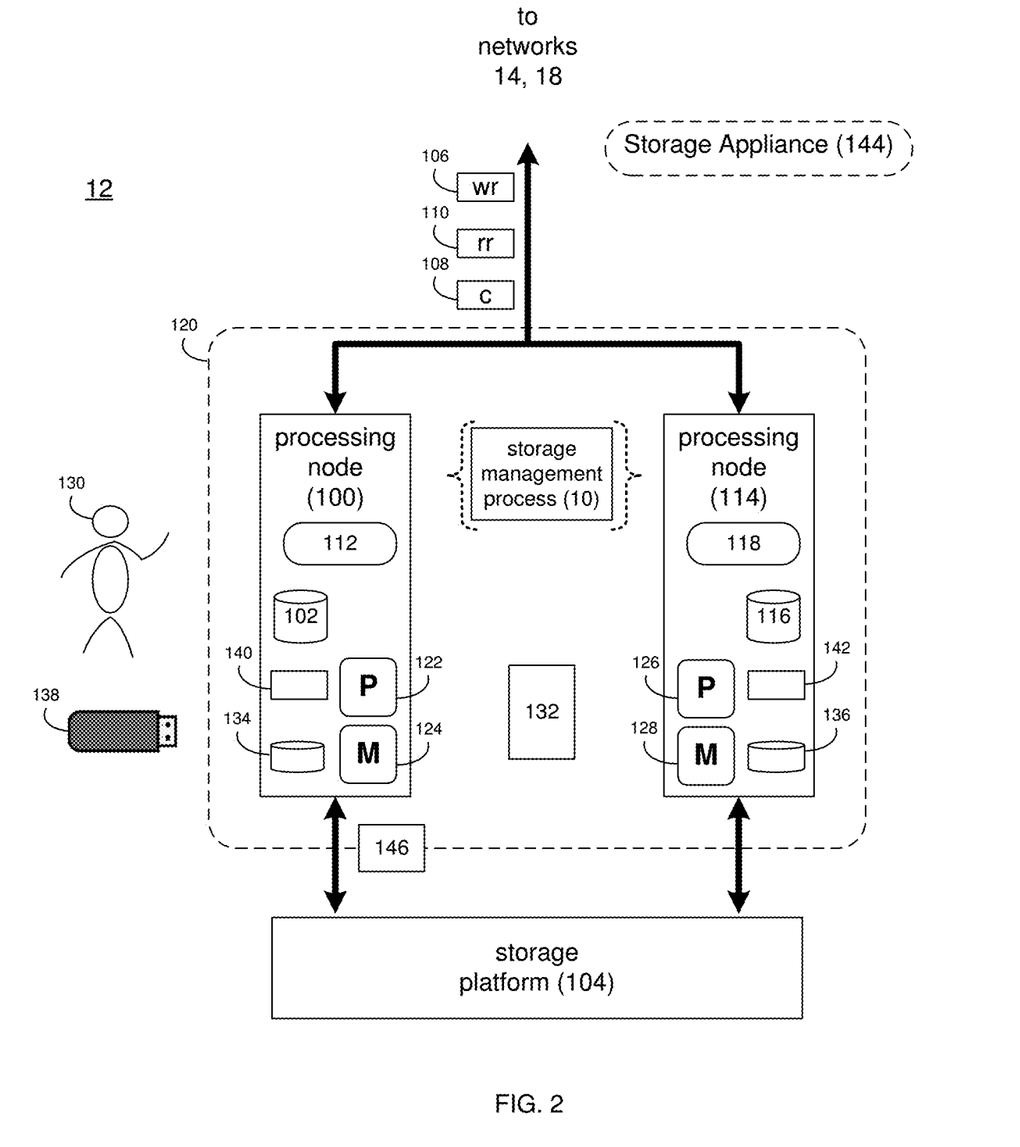
FIG. 2 is a diagrammatic view of the storage system of FIG. 1.

Referring also to FIG. 2, there is shown a general implementation of storage system 12. In this general implementation, storage system 12 may include processing node 100. An example of processing node 100 may include but is not limited to a processing node within a storage appliance. As is known in the art, a storage appliance is a type of computing appliance that provides data to (or manages data for) other network-connected computing devices. Processing node 100 may be configured to perform computational tasks and may be configured to store data locally (on local storage 102) or within storage platform 104.

Depending upon the manner in which storage system 12 is configured, storage platform 104 may include a single storage device (such as a single hard disk drive or a single solid state storage device) or may include a plurality of storage devices that are configured to provide various levels of performance and/or high availability. For example and if storage platform 104 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 102) coupled to e.g., processing node 100, may be executed by one or more processors (not shown) and one or more memory architectures (not shown) included within processing node 100. Storage device 102 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 106 (i.e. a request that content 108 be written to storage system 12) and data read request 110 (i.e. a request that content 108 be read from storage system 12).

During operation of processing node 100, content 108 to be written to storage system 12 may be processed by processing node 100. Additionally/alternatively and when storage system 12 is configured as an application server, content 108 to be written to storage system 12 may be internally generated by processing node 100.

Processing node 100 may include cache memory system 112. Examples of cache memory system 112 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 108 within cache memory system 112. Depending upon the manner in which cache memory system 112 is configured, processing node 100 may immediately write content 108 to local storage 102 or storage platform 104 (if cache memory system 112 is configured as a write-through cache) or may subsequently write content 108 to local storage 102 or storage platform 104 (if cache memory system 112 is configured as a write-back cache).

Storage system 12 may be configured to include a plurality of processing nodes, each of which may be configured to receive, generate and/or process content (e.g., content 108). For example and in addition to processing node 100, storage system 12 may include one or more additional processing nodes (e.g., processing node 114). An example of processing node 114 may include a processing node within a storage appliance. Processing node 114 may be configured to perform computational tasks and may be configured to store data locally (on local storage 116) or within storage platform 104.

Processing node 114 may include cache memory system 118. Examples of cache memory system 118 may include but are not limited to a volatile, solid-state, cache memory system (e.g., a static RAM cache memory system) and/or a non-volatile, solid-state, cache memory system (e.g., a flash-based, cache memory system). Processing node 114 may initially store content 108 within cache memory system 118. Depending upon the manner in which cache memory system 118 is configured, processing node 114 may immediately write content 108 to local storage 116 or storage platform 104 (if cache memory system 118 is configured as a write-through cache) or may subsequently write content 108 to local storage 116 or storage platform 104 (if cache memory system 118 is configured as a write-back cache).

Processing node 100 and (in this example) processing node 114 may be included within a single storage appliance (e.g., storage appliance 120), thus allowing storage appliance 120 to provide a level of high availability. Processing nodes 110, 114 may be configured so that one node is a primary node and the other node is a secondary node.

One or more of processing nodes 100, 114 may be configured to execute one of more containers. For example, processing node 100 may execute containers 122, 124, while processing node 114 may execute containers 126, 128.

As is known in the art, containers may offer a logical packaging mechanism in which applications may be abstracted from the environment in which they actually run. This decoupling allows container-based applications to be deployed easily and consistently, regardless of whether the target environment is a private data center, the public cloud, or even a developer's personal laptop. Containerization may provide a clean separation of concerns, as developers may focus on their application logic and dependencies, while IT operations teams may focus on deployment and management without bothering with application details such as specific software versions and configurations specific to the application. For those coming from virtualized environments, containers are often compared with virtual machines (VMs). Like virtual machines, containers may allow you to package your application together with libraries and other dependencies, providing isolated environments for running your software services.

Benefits of containers may include but are not limited to:

Less Overhead: Containers require less system resources than traditional or hardware virtual machine environments because they don't include operating system images.

Increased Portability: Applications running in containers can be deployed easily to multiple different operating systems and hardware platforms.

More Consistent Operation: DevOps teams know applications in containers will run the same, regardless of where they are deployed.

Greater Efficiency: Containers allow applications to be more rapidly deployed, patched, or scaled.

Better Application Development: Containers support agile and DevOps efforts to accelerate development, test, and production cycles.

For example and with respect to processing node 100, processing node 100 may execute a platform container (e.g., platform container 122) and a maintenance container (e.g., maintenance container 124). Further and with respect to processing node 114, processing node 114 may execute a platform container (e.g., platform container 126) and a maintenance container (e.g., maintenance container 128).

Generally speaking, a platform container (e.g., platform containers 122, 126) may effectuate the general operation of a processing node (e.g., processing nodes 100, 114 respectively). Conversely, a maintenance container (e.g., maintenance container 124, 128) may effectuate a stripped down package of maintenance services (in a fashion similar to Windows™ SafeMode™).

Storage Management Process

During operation of storage system 12, storage appliance 120 may process and service various data requests, such as data write request 106 (i.e. a request that content 108 be written to storage system 12) and data read request 110 (i.e. a request that content 108 be read from storage system 12). During normal operation of storage system 12, storage appliance 120 may operate normally and the platform containers (e.g., platform containers 122, 126) may effectuate the general operation of their respective processing nodes (e.g., processing nodes 100, 114 respectively). However, it is foreseeable that storage appliance 120 may not always operate normally. And in such a situation, the maintenance containers (e.g., maintenance containers 124, 128) may effectuate the maintenance operations of their respective processing nodes (e.g., processing nodes 100, 114 respectively).

In order to provide a requisite level of security with respect to electronic content stored within storage system 12 and/or storage appliance 120, password-protected user accounts may be utilized to gain access to storage system 12 and/or storage appliance 120 (and the electronic content contained therein). Unfortunately and when passwords are forgotten/lost, lack of access to such electronic content may occur (along with the complications related thereto). Accordingly, storage system 12 and/or storage appliance 120 may enable the execution of a recovery procedure configured to allow administrative access to storage system 12 and/or storage appliance 120 when the normal password-authenticated methods are not available (e.g., when all administrators forget their passwords, have left the company, and/or are not available during an emergency), thus allowing the passwords associated with one or more user accounts (e.g., administrative accounts, service accounts, individual accounts, etc.) to be simply and easily reset.

Assume for illustrative purposes that an administrator (e.g., administrator 130) of storage appliance 120 may want to reset one or more passwords associated with one or more user accounts of storage appliance 120. Accordingly, administrator 130 may utilize recovery procedure 132 to effectuate the same. While recovery procedure 132 will be described as effectuating a password reset operation, this is for illustrative purposes only and is not intended to be a limitation of this disclosure, as other configurations are possible and are considered to be within the scope of this disclosure. For example, recovery procedure 132 may be configured to perform other operations, such as effectuating external key management functionality via the Key Management Interoperability Protocol (KMIP).

Recovery procedure 132 may be initiated in various ways. For example, administrator 130 may press a recovery button for the processing node on which the administrator would like to execute recovery procedure 132. For example, administrator 130 may press recovery button 134 if they want to execute recovery procedure 132 on processing node 100; and may press recovery button 136 if they want to execute recovery procedure 132 on processing node 114.

Additionally/alternatively, administrator 130 may insert a recovery USB drive (e.g., USB drive 138) into a USB port for the processing node on which the administrator would like to execute recovery procedure 132. For example, administrator 130 may insert USB drive 138 into USB port 140 if they want to execute recovery procedure 132 on processing node 100; and may insert USB drive 138 into USB port 142 if they want to execute recovery procedure 132 on processing node 114.

Figure 3:
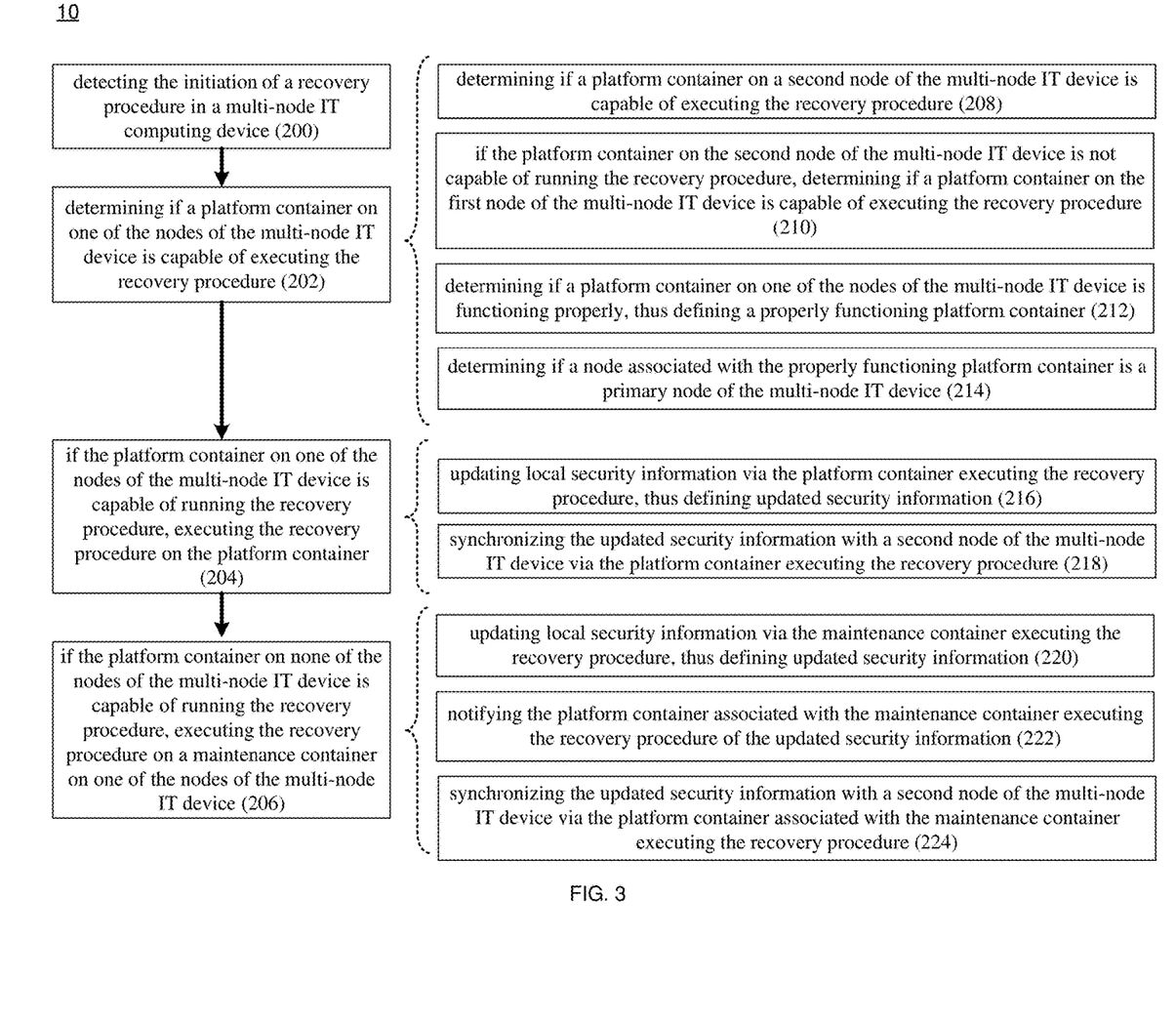
FIG. 3 is a flow chart of the storage management process of FIG. 1.

Referring also to FIG. 3, storage management process 10 may detect 200 the initiation of the recovery procedure (e.g., recovery procedure 132) in a multi-node IT computing device (e.g., storage appliance 120). As discussed above, this recovery procedure (e.g., recovery procedure 132) may be initiated in various ways, examples of which may include but are not limited to: pressing a recovery button for the processing node on which the administrator would like to execute recovery procedure 132 and/or inserting a recovery USB drive (e.g., USB drive 138) into a USB port for the processing node on which the administrator would like to execute recovery procedure 132.

As discussed above, processing nodes 110, 114 may be configured so that one node of processing nodes 110, 114 is configured as a primary node and the other node of processing nodes 110, 114 is configured as a secondary node. And when initiating the recovery procedure (e.g., recovery procedure 132), the recovery procedure (e.g., recovery procedure 132) should be executed on the primary node (if possible). Unfortunately, the administrator (e.g., administrator 130) may not know which processing node (e.g., processing node 110 or processing node 114) is the primary node. Therefore, it is foreseeable that the administrator (e.g., administrator 130) may initiate the recovery procedure (e.g., recovery procedure 132) on the secondary node. Accordingly and as will be discussed below, storage management process 10 may implement procedures to: e.g., determine whether a processing node is a primary node and determine the status of platform containers within processing nodes.

Once the initiation of the recovery procedure (e.g., recovery procedure 132) is detected 200, storage management process 10 may determine 202 if a platform container (e.g., platform container 122 and/or platform container 126) on one of the nodes (e.g., processing node 100 and/or processing node 114) of the multi-node IT device (e.g., storage appliance 120) is capable of executing the recovery procedure (e.g., recovery procedure 132).

Generally speaking, if the platform container (e.g., platform container 122 and/or platform container 126) on one of the nodes (e.g., processing node 100 and/or processing node 114) of the multi-node IT device (e.g., storage appliance 120) is capable of running the recovery procedure (e.g., recovery procedure 132), storage management process 10 may execute 204 the recovery procedure (e.g., recovery procedure 132) on the platform container (e.g., platform container 122 and/or platform container 126).

Alternatively, if none of the platform containers (e.g., platform container 122 and/or platform container 126) on any of the nodes (e.g., processing node 100 and/or processing node 114) of the multi-node IT device (e.g., storage appliance 120) are capable of running the recovery procedure (e.g., recovery procedure 132), storage management process 10 may execute 206 the recovery procedure (e.g., recovery procedure 132) on a maintenance container (e.g., maintenance container 124 and/or maintenance container 128) on one of the nodes of the multi-node IT device (e.g., storage appliance 120).

For the following example, assume that initiation of the recovery procedure (e.g., recovery procedure 132) in the multi-node IT computing device (e.g., storage appliance 120) occurs on a first node (e.g., processing node 100) of the multi-node IT device (e.g., storage appliance 120). Accordingly, assume that administrator 130 pressed recovery button 134 on processing node 100 or inserted USB drive 138 into USB port 140 on processing node 100.

As discussed above and once initiation of the recovery procedure (e.g., recovery procedure 132) is detected 200, storage management process 10 may determine 202 if a platform container (e.g., platform container 122 and/or platform container 126) on one of the nodes (e.g., processing node 100 and/or processing node 114) of the multi-node IT device (e.g., storage appliance 120) is capable of executing the recovery procedure (e.g., recovery procedure 132).

Specifically and when determining 202 if a platform container (e.g., platform container 122 and/or platform container 126) on one of the nodes (e.g., processing node 100 and/or processing node 114) of the multi-node IT device (e.g., storage appliance 120) is capable of executing the recovery procedure (e.g., recovery procedure 132), storage management process 10 may determine 208 if a platform container (e.g., platform container 126) on a second node (e.g., processing node 114) of the multi-node IT device (e.g., storage appliance 120) is capable of executing the recovery procedure (e.g., recovery procedure 132).

If the platform container (e.g., platform container 126) on the second node (e.g., processing node 114) of the multi-node IT device (e.g., storage appliance 120) is not capable of running the recovery procedure (e.g., recovery procedure 132), storage management process 10 may determine 210 if a platform container (e.g., platform container 122) on the first node (e.g., processing node 100) of the multi-node IT device (e.g., storage appliance 120) is capable of executing the recovery procedure (e.g., recovery procedure 132).

Accordingly and when recovery procedure 132 is initiated on processing node 100 of storage appliance 120, storage management process 10 may first determine 208 if platform container 126 on processing node 114 of storage appliance 120 is capable of executing recovery procedure 132. If not, storage management process 10 may then determine 210 if platform container 122 on processing node 100 of storage appliance 120 is capable of executing recovery procedure 132.

Additionally and when determining 202 if a platform container (e.g., platform container 122 and/or platform container 126) on one of the nodes (e.g., processing node 100 and/or processing node 114) of the multi-node IT device (e.g., storage appliance 120) is capable of executing the recovery procedure (e.g., recovery procedure 132), storage management process 10 may:
- determine 212 if a platform container (e.g., platform container 122 and/or platform container 126) on one of the nodes (e.g., processing node 100 and/or processing node 114) of the multi-node IT device (e.g., storage appliance 120) is functioning properly, thus defining a properly functioning platform container.
- determine 214 if a node (e.g., processing node 100 or processing node 114) associated with the properly functioning platform container is a primary node of the multi-node IT device (e.g., storage appliance 120).

Various Examples

Figure 4:
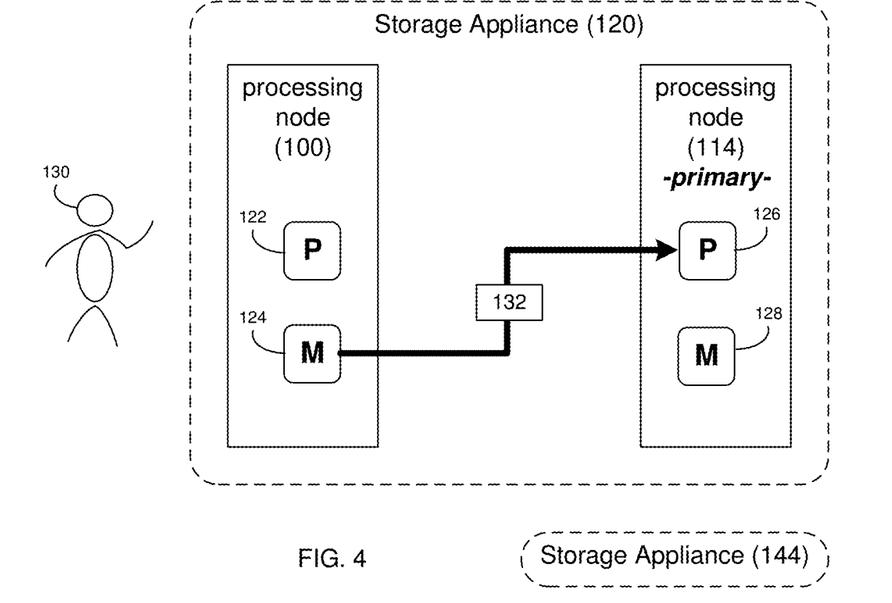
FIGS. 4-7 are diagrammatic views of various operational conditions of the storage system of FIG. 2.

Referring also to FIG. 4, storage appliance 120 is operating normally in this example and processing node 114 is the primary node of storage appliance 120.
- In this example, administrator 130 selected processing node 100 for initiating recovery procedure 132 but processing node 114 is the primary node.
- Maintenance container 124 of processing node 100 would determine 212 if platform container 126 of processing node 114 is functioning properly (which it is).
- Maintenance container 124 of processing node 100 would then determine 214 if processing node 114 is the primary node (which it is).
- Therefore, platform container 126 of processing node 114 would then execute recovery procedure 132 to reset one or more passwords associated with one or more user accounts of storage appliance 120.

Figure 5:
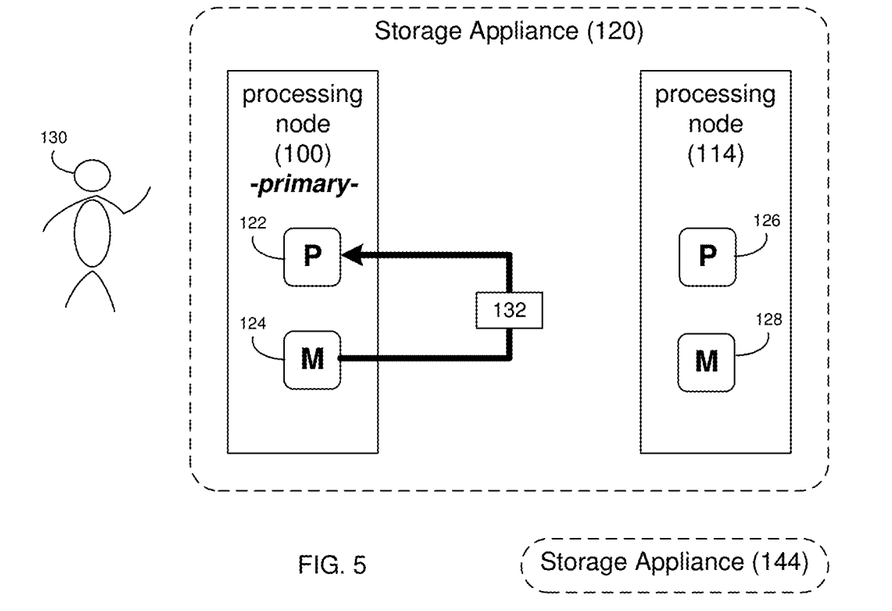

Referring also to FIG. 5, storage appliance 120 is operating normally in this example and processing node 100 is the primary node of storage appliance 120.
- In this example, administrator 130 selected processing node 100 for initiating recovery procedure 132 and processing node 100 is the primary node.
- Maintenance container 124 of processing node 100 would determine 212 if platform container 126 of processing node 114 is functioning properly (which it is).
- Maintenance container 124 of processing node 100 would then determine 214 if processing node 114 is the primary node (which it is not).
- Maintenance container 124 of processing node 100 would then determine 212 if platform container 122 of processing node 100 is functioning properly (which it is).
- Maintenance container 124 of processing node 100 would then determine 214 if processing node 100 is the primary node (which it is).
- Therefore, platform container 122 of processing node 100 would then execute recovery procedure 132 to reset one or more passwords associated with one or more user accounts of storage appliance 120.

Figure 6:
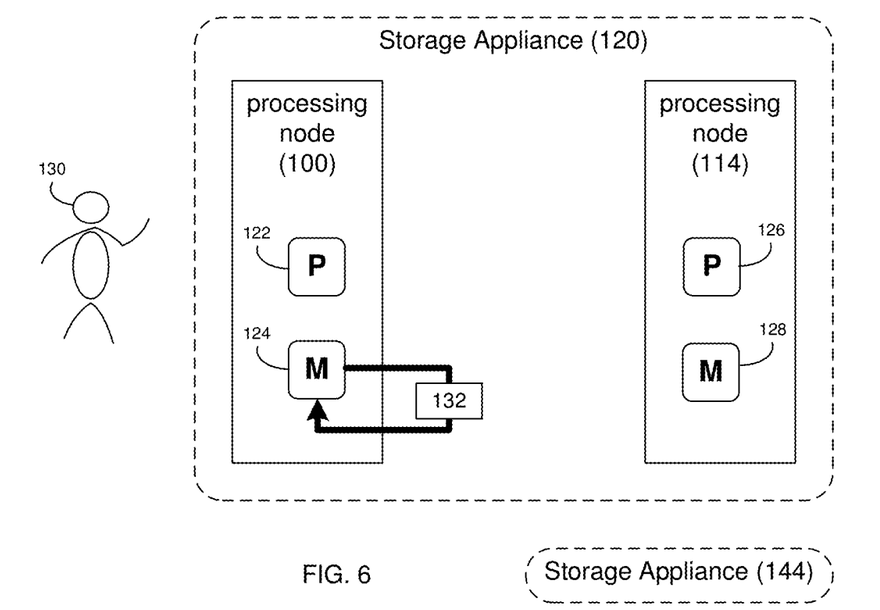

Referring also to FIG. 6, storage appliance 120 is not operating normally in this example (e.g., storage appliance 120 is not fully configured) and there is no primary node for storage appliance 120.

In this example, administrator 130 selected processing node 100 for initiating recovery procedure 132 but neither processing node 100 nor processing node 114 is the primary node.

Maintenance container 124 of processing node 100 would determine 212 if platform container 126 of processing node 114 is functioning properly (which it is).

Maintenance container 124 of processing node 100 would then determine 214 if processing node 114 is the primary node (which it is not).

Maintenance container 124 of processing node 100 would then determine 212 if platform container 122 of processing node 100 is functioning properly (which it is).

Maintenance container 124 of processing node 100 would then determine 214 if processing node 100 is the primary node (which it is not).

Therefore, maintenance container 124 of processing node 100 would execute recovery procedure 132 to reset one or more passwords associated with one or more user accounts of storage appliance 120.

Figure 7:
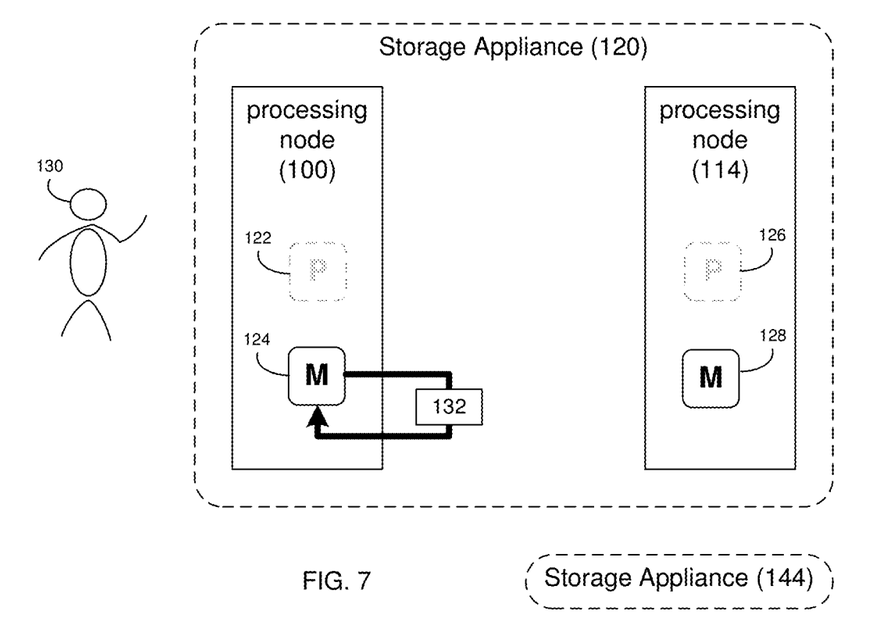

Referring also to FIG. 7, storage appliance 120 is not operating normally in this example (e.g., storage appliance 120 does not have a functioning platform container) and there is no primary node for storage appliance 120.

In this example, administrator 130 selected processing node 100 for initiating recovery procedure 132 but neither processing node 100 nor processing node 114 has a functioning platform container or is the primary node.

Maintenance container 124 of processing node 100 would determine 212 if platform container 126 of processing node 114 is functioning properly (which it is not).

Maintenance container 124 of processing node 100 would then determine 212 if platform container 122 of processing node 100 is functioning properly (which it is not).

Therefore, maintenance container 124 of processing node 100 would execute recovery procedure 132 to reset one or more passwords associated with one or more user accounts of storage appliance 120.

As discussed above, recovery procedure 132 may be executed to reset one or more passwords associated with one or more user accounts of storage appliance 120. Accordingly and once these passwords are reset, these reset passwords may need to be synchronized with the other nodes in the multi-node IT device (e.g., storage appliance 120). Additionally, these reset passwords may need to be synchronized with the other multi-node IT devices (e.g., storage appliance 144) coupled to storage appliance 120. For example, numerous storage appliances (such as storage appliance 120 and storage appliance 144) may be coupled together to form a cluster. And while only two storage appliances (e.g., storage appliances 120, 144) are shown in this example, this is for illustrative purposes only and is not intended to be a limitation of this disclosure, as other configurations are possible and are considered to be within the scope of this disclosure. For example, two additional storage appliances (not shown) may be combined with storage appliances 120, 144 to form an eight node/four appliance cluster. As will be explained below, the manner in which these reset passwords are synchronized may vary depending upon whether the platform containers within the processing nodes are fully operational (as will be explained below).

For the following example, assume that platform container 122 of processing node 100 is executing 204 recovery procedure 132. Accordingly and when executing 204 the recovery procedure (e.g., recovery procedure 132) on the platform container (e.g., platform container 122) on one of the nodes (e.g., processing node 100) of the multi-node IT device (e.g., storage appliance 120), storage management process 10 may:

- update 216 local security information via the platform container (e.g., platform container 122) executing the recovery procedure (e.g., recovery procedure 132), thus defining updated security information 146; and
- synchronize 218 updated security information 146 with a second node (e.g., processing node 114) of the multi-node IT device (e.g., storage appliance 120) via the platform container (e.g., platform container 122) executing the recovery procedure (e.g., recovery procedure 132).

Accordingly and in this example, once updated security information 146 is generated by platform container 122 of processing node 100, platform container 122 may provide updated security information 146 to processing node 114 for synchronization purposes. Additionally, platform container 122 may provide updated security information 146 to the processing nodes in other multi-node IT devices (e.g., storage appliance 144) coupled to storage appliance 120.

For the following example, assume that maintenance container 124 of processing node 100 is executing 206 recovery procedure 132. Accordingly and when executing 206 the recovery procedure (e.g., recovery procedure 132) on a maintenance container (e.g., maintenance container 124) on one of the nodes (e.g., processing node 100) of the multi-node IT device (e.g., storage appliance 120), storage management process 10 may:

- update 220 local security information via the maintenance container (e.g., maintenance container 124) executing the recovery procedure (e.g., recovery procedure 132), thus defining updated security information 146;
- notify 222 the platform container (e.g., platform container 122) associated with the maintenance container (e.g., maintenance container 124) executing the recovery procedure (e.g., recovery procedure 132) of the updated security information (e.g., updated security information 146); and
- synchronize 224 the updated security information (e.g., updated security information 146) with a second node (e.g., processing node 114) of the multi-node IT device (e.g., storage appliance 120) via the platform container (e.g., platform container 122) associated with the maintenance container (e.g., maintenance container 124) executing the recovery procedure (e.g., recovery procedure 132).

Accordingly and in this example, once updated security information 146 is generated by maintenance container 124 of processing node 100, maintenance container 124 may e.g., set a flag to indicate that the security information has been updated. Therefore and upon platform container 122 restarting and functioning properly, platform container 122 may see the flag and use updated security information 146. Platform container 122 may then provide updated security information 146 to processing node 114 for synchronization purposes. Additionally, platform container 122 may provide updated security information 146 to the processing nodes in other multi-node IT devices (e.g., storage appliance 144) coupled to storage appliance 120.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    detecting the initiation of a recovery procedure in a multi-node IT computing device, including detecting insertion of a recovery USB drive;
    determining if a platform container on one of the nodes of the multi-node IT device is capable of executing the recovery procedure, wherein one of the nodes of the multi-node IT device is configured to execute the recovery procedure on the platform container based on the determination that the platform container on one of the nodes of the multi-node IT device is capable of running the recovery procedure and one of the nodes of the multi-node IT device is configured to execute the recovery procedure on a maintenance container based on the determination that the platform container on none of the nodes of the multi-node IT device is capable of running the recovery procedure;
    executing the recovery procedure, using the platform container or the maintenance container based on the determination, by resetting one or more passwords associated with one or more user accounts of at least one of the nodes of the multi-node IT computing device.

2. The computer-implemented method of claim 1 wherein the initiation of the recovery procedure in the multi-node IT computing device occurred on a first node of the multi-node IT device.

3. The computer-implemented method of claim 2 wherein determining if a platform container on one of the nodes of the multi-node IT device is capable of executing the recovery procedure includes:
    determining if a platform container on a second node of the multi-node IT device is capable of executing the recovery procedure; and
    if the platform container on the second node of the multi-node IT device is not capable of running the recovery procedure, determining if a platform container on the first node of the multi-node IT device is capable of executing the recovery procedure.

4. The computer-implemented method of claim 1 wherein determining if a platform container on one of the nodes of the multi-node IT device is capable of executing the recovery procedure includes:
    determining if a platform container on one of the nodes of the multi-node IT device is functioning properly, thus defining a properly functioning platform container.

5. The computer-implemented method of claim 4 wherein determining if a platform container on one of the nodes of the multi-node IT device is capable of executing the recovery procedure includes:
    determining if a node associated with the properly functioning platform container is a primary node of the multi-node IT device.

6. The computer-implemented method of claim 1 wherein executing the recovery procedure on the platform container includes:
    updating local security information via the platform container executing the recovery procedure, thus defining updated security information; and
    synchronizing the updated security information with a second node of the multi-node IT device via the platform container executing the recovery procedure.

7. The computer-implemented method of claim 1 wherein executing the recovery procedure on a maintenance container on one of the nodes of the multi-node IT device includes:
    updating local security information via the maintenance container executing the recovery procedure, thus defining updated security information;
    notifying the platform container associated with the maintenance container executing the recovery procedure of the updated security information; and
    synchronizing the updated security information with a second node of the multi-node IT device via the platform container associated with the maintenance container executing the recovery procedure.

8. A computer program product residing on a non-transitory computer readable medium having a plurality of instructions stored thereon which, when executed by a processor, cause the processor to perform operations comprising:
    detecting the initiation of a recovery procedure in a multi-node IT computing device, including detecting insertion of a recovery USB drive;
    determining if a platform container on one of the nodes of the multi-node IT device is capable of executing the recovery procedure;
    if the platform container on one of the nodes of the multi-node IT device is capable of running the recovery procedure, executing the recovery procedure on the platform container; and
    if the platform container on none of the nodes of the multi-node IT device is capable of running the recovery procedure, executing the recovery procedure on a maintenance container on one of the nodes of the multi-node IT device, wherein executing the recover procedure includes resetting one or more passwords associated with one or more user accounts of at least one of the nodes of the multi-node IT computing device.

9. The computer program product of claim 8 wherein the initiation of the recovery procedure in the multi-node IT computing device occurred on a first node of the multi-node IT device.

10. The computer program product of claim 9 wherein determining if a platform container on one of the nodes of the multi-node IT device is capable of executing the recovery procedure includes:
    determining if a platform container on a second node of the multi-node IT device is capable of executing the recovery procedure; and
    if the platform container on the second node of the multi-node IT device is not capable of running the recovery procedure, determining if a platform container on the first node of the multi-node IT device is capable of executing the recovery procedure.

11. The computer program product of claim 8 wherein determining if a platform container on one of the nodes of the multi-node IT device is capable of executing the recovery procedure includes:
    determining if a platform container on one of the nodes of the multi-node IT device is functioning properly, thus defining a properly functioning platform container.

12. The computer program product of claim 11 wherein determining if a platform container on one of the nodes of the multi-node IT device is capable of executing the recovery procedure includes:
    determining if a node associated with the properly functioning platform container is a primary node of the multi-node IT device.

13. The computer program product of claim 8 wherein executing the recovery procedure on the platform container includes:
    updating local security information via the platform container executing the recovery procedure, thus defining updated security information; and
    synchronizing the updated security information with a second node of the multi-node IT device via the platform container executing the recovery procedure.

14. The computer program product of claim 8 wherein executing the recovery procedure on a maintenance container on one of the nodes of the multi-node IT device includes:
    updating local security information via the maintenance container executing the recovery procedure, thus defining updated security information;
    notifying the platform container associated with the maintenance container executing the recovery procedure of the updated security information; and
    synchronizing the updated security information with a second node of the multi-node IT device via the platform container associated with the maintenance container executing the recovery procedure.

15. A computing system comprising:
    a processor and memory configured to perform operations including:
        detecting the initiation of a recovery procedure in a multi-node IT computing device, including detecting insertion of a recovery USB drive;
        determining if a platform container on one of the nodes of the multi-node IT device is capable of executing the recovery procedure;
        if the platform container on one of the nodes of the multi-node IT device is capable of running the recovery procedure, executing the recovery procedure on the platform container; and
        if the platform container on none of the nodes of the multi-node IT device is capable of running the recovery procedure, executing the recovery procedure on a maintenance container on one of the nodes of the multi-node IT device, wherein executing the recover procedure includes resetting one or more passwords associated with one or more user accounts of at least one of the nodes of the multi-node IT computing device.

16. The computing system of claim 15 wherein the initiation of the recovery procedure in the multi-node IT computing device occurred on a first node of the multi-node IT device.

17. The computing system of claim 16 wherein determining if a platform container on one of the nodes of the multi-node IT device is capable of executing the recovery procedure includes:
    determining if a platform container on a second node of the multi-node IT device is capable of executing the recovery procedure; and
    if the platform container on the second node of the multi-node IT device is not capable of running the recovery procedure, determining if a platform container on the first node of the multi-node IT device is capable of executing the recovery procedure.

18. The computing system of claim 15 wherein determining if a platform container on one of the nodes of the multi-node IT device is capable of executing the recovery procedure includes:
    determining if a platform container on one of the nodes of the multi-node IT device is functioning properly, thus defining a properly functioning platform container.

19. The computing system of claim 18 wherein determining if a platform container on one of the nodes of the multi-node IT device is capable of executing the recovery procedure includes:
    determining if a node associated with the properly functioning platform container is a primary node of the multi-node IT device.

20. The computing system of claim 15 wherein executing the recovery procedure on the platform container includes:
    updating local security information via the platform container executing the recovery procedure, thus defining updated security information; and
    synchronizing the updated security information with a second node of the multi-node IT device via the platform container executing the recovery procedure.

21. The computing system of claim 15 wherein executing the recovery procedure on a maintenance container on one of the nodes of the multi-node IT device includes:
    updating local security information via the maintenance container executing the recovery procedure, thus defining updated security information;
    notifying the platform container associated with the maintenance container executing the recovery procedure of the updated security information; and
    synchronizing the updated security information with a second node of the multi-node IT device via the platform container associated with the maintenance container executing the recovery procedure.

* * * * *